United States Patent [19]

Sasaki et al.

[11] Patent Number: 5,049,267
[45] Date of Patent: Sep. 17, 1991

[54] FILTER ARRANGEMENT FOR A FUEL TANK COMPRISING SHAPED MESH SECTIONS

[75] Inventors: Michiaki Sasaki, Hadano; Joji Masuda, Ebina; Koichi Takahashi, Zama, all of Japan

[73] Assignee: Nissan Motor Co., Japan

[21] Appl. No.: 480,342

[22] Filed: Feb. 13, 1990

Related U.S. Application Data

[63] Continuation-in-part of Ser. No. 227,805, Aug. 3, 1988, abandoned.

[30] Foreign Application Priority Data

Aug. 6, 1987 [JP] Japan .......................... 62-119824[U]

[51] Int. Cl.$^5$ .............................................. B01D 35/02
[52] U.S. Cl. ..................................... 210/172; 210/258; 210/316; 210/318; 210/461; 210/499
[58] Field of Search ............... 210/128, 171, 172, 167, 210/232, 314, 317, 316, 318, 416.4, 441, 461, 460, 486, 492, 505, 503, 483, 499; 55/486–488, 529

[56] References Cited

U.S. PATENT DOCUMENTS

| | | | |
|---|---|---|---|
| 1,568,796 | 1/1926 | Breer | 210/460 |
| 2,424,211 | 7/1947 | Webb | 210/461 |
| 3,526,323 | 9/1970 | Smith | 210/460 |
| 3,732,815 | 5/1973 | Collingwood et al. | 210/499 |
| 3,759,393 | 9/1973 | Tate et al. | 55/487 |
| 3,826,372 | 7/1974 | Bell | 210/172 |
| 4,119,543 | 10/1978 | Lawson et al. | 210/505 |
| 4,129,503 | 12/1978 | Joseph | 210/232 |
| 4,304,664 | 12/1981 | McAlindon et al. | 210/172 |
| 4,312,753 | 1/1982 | Bell | 210/416.4 |
| 4,428,835 | 1/1984 | Nagashima | 210/416.4 |
| 4,561,977 | 12/1985 | Sasaki | 210/356 |
| 4,600,511 | 1/1986 | Sherman et al. | 210/317 |
| 4,618,417 | 10/1986 | Yamanouchi et al. | 210/149 |
| 4,618,422 | 10/1986 | Sasaki et al. | 210/172 |
| 4,684,463 | 8/1987 | Mizusawa | 210/416.4 |
| 4,717,477 | 1/1988 | Nagashima | 210/416.4 |
| 4,743,370 | 5/1988 | Mizusawa | 210/172 |
| 4,783,260 | 11/1988 | Kurihara | 210/416.4 |
| 4,805,525 | 2/1989 | Bivens | 210/461 |

FOREIGN PATENT DOCUMENTS

| | | | |
|---|---|---|---|
| 2551671 | 3/1985 | France | 210/505 |
| 186616 | 10/1984 | Japan | 210/505 |
| 61-126617 | 8/1986 | Japan | 210/416.4 |
| 275495 | 12/1986 | Japan | 210/505 |

Primary Examiner—Robert A. Dawson
Assistant Examiner—Joseph Drodge
Attorney, Agent, or Firm—Leydig, Voit & Mayer

[57] ABSTRACT

A filter arrangement disposed in a fuel tank of an automotive vehicle has a flat upper section made of mesh. A lower section made of mesh is joined to the upper section to define a space between the upper and lower sections. The space is filled with fuel filtered by the upper and lower sections and communicates with a fuel pump. The upper and lower sections are different in shape and therefore deform differently under suction due to operation of the fuel pump. This prevents the filter arrangement from collapsing under suction, thereby effectively ensuring a fuel flow passage leading to the fuel pump.

31 Claims, 4 Drawing Sheets

FILTER ARRANGEMENT FOR A FUEL TANK COMPRISING SHAPED MESH SECTIONS

This application is a continuation-in-part of application Ser. No. 07/227,805, filed Aug. 3, 1988 and now abandoned.

BACKGROUND OF THE INVENTION

1. Field of the Invention

This invention relates to improvements in a filter arrangement disposed in a fuel tank and connected to a fuel pump in a fuel supply system, for example, of an automotive vehicle, and more particularly to such a filter arrangement which is prevented from collapsing even under vacuum due to sucking action of a fuel pump.

2. Description of the Prior Art

As a filter arrangement disposed inside a fuel tank and connected to a fuel pump, a variety of ones have been proposed and put into practical use. One of them is disclosed in Japanese Utility Model Provisional Publication No. 61-26617. In this publication, the filter arrangement includes a cap-shaped upper section located facing the upper side of a fuel tank. A lower section made of a mesh is connected to the open periphery of the cap-shaped upper section so that a hollow chamber is defined between the upper and lower sections. This filter arrangement is installed on a fuel pump at the suction port in such a manner that the lower section is spaced from the bottom inner surface of the fuel tank.

Figure 7:
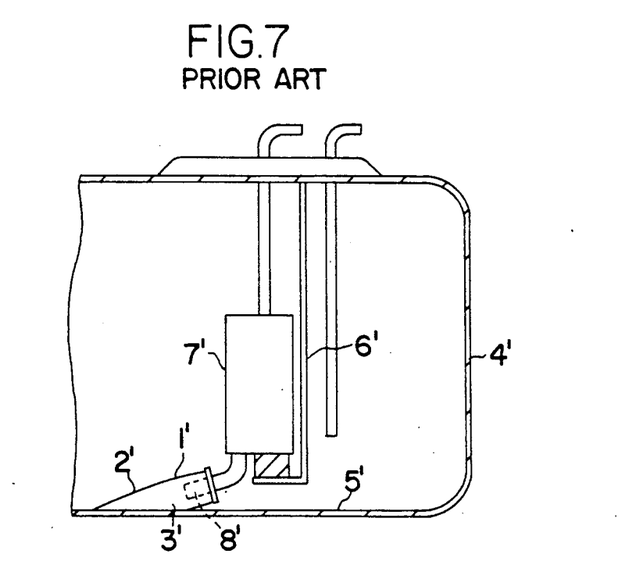
FIG. 7 is a schematic illustration of a conventional filter arrangement disposed inside a fuel tank.

In this case, fuel between the lower section and the tank bottom inner surface cannot be effectively sucked into the fuel pump. In order to effectively suck the fuel in this region, the filter arrangement shown in FIG. 7 was conceived. In this filter arrangement, an upper section 2' and a lower section 3' both made of mesh are symmetrically formed, and secured to each other to form a bag-shaped filter 1'. The filter 1' is connected to a suction pipe 8' of a fuel pump 7' in such a manner as to be brought into elastic contact with the bottom inner surface of the fuel tank 4' so as to achieve vibration damping in addition to effective sucking of fuel.

Difficulties have been encountered even in such a filter 1', since the upper and lower sections 2', 3' unavoidably collapse inwards to come into contact with each other under a vacuum generated by the fuel pump 7'. As a result, the flow passage for fuel is blocked and the supply of fuel to the vehicle is cut off. In order to prevent such difficulties, the suction pipe 8' may be extended inside the filter 1' to suppress the collapse of the netting upper and lower section 2', 3' as indicated by phantom lines in FIG. 7. However, the extended suction pipe 8' tends to cause cavitation and vapor lock.

SUMMARY OF THE INVENTION

It is an object of the present invention to provide an improved filter arrangement, disposed inside a fuel tank, which can ensure a sufficient fuel flow passage therein even under the suction generated by a fuel pump positioned downstream of the filter arrangement.

The filter arrangement of the present invention includes a first section made of mesh disposed inside a fuel tank. A second section made of mesh is joined with the first section to define a space between it and the first section. The space is in communication with a fuel pump and filled with fuel filtered by the first and second sections. The first and second sections are different in shape from each other.

Accordingly, even if the upper and lower sections slightly deform inwardly under vacuum developed in the space during sucking by the fuel pump, the mades of deformation of the first and second sections are different from each other because of the fact the first and second sections are different in shape from each other. As a result, the first and second netting sections are prevented from being brought into contact with each other, and therefore fuel passage is maintained between the first and second sections.

DETAILED DESCRIPTION OF THE INVENTION

Referring now to FIGS. 1 to 4, an embodiment of a filter arrangement according to the present invention is illustrated by reference character F. The filter arrangement F in this embodiment is disposed inside a fuel tank 4 of an automotive vehicle. The filter arrangement F comprises upper and lower sections 10, 11 which are formed of a mesh. The upper section 10 is generally flat and its shape in plan resembles an hourglass. Its longitudinal sides 12, 12 are arcuate so that the central portions of the sides 12, 12 are closer to one another than the end portions of the same edges. The lower section 11 is generally vessel-shaped and has an upper peripheral edge (not shown) corresponding to the continuous side edges 12, 13 of the upper section 10. The peripheral edge of the lower section 11 is connected to the upper section 10 at the side edges 12, 13.

Figure 1:
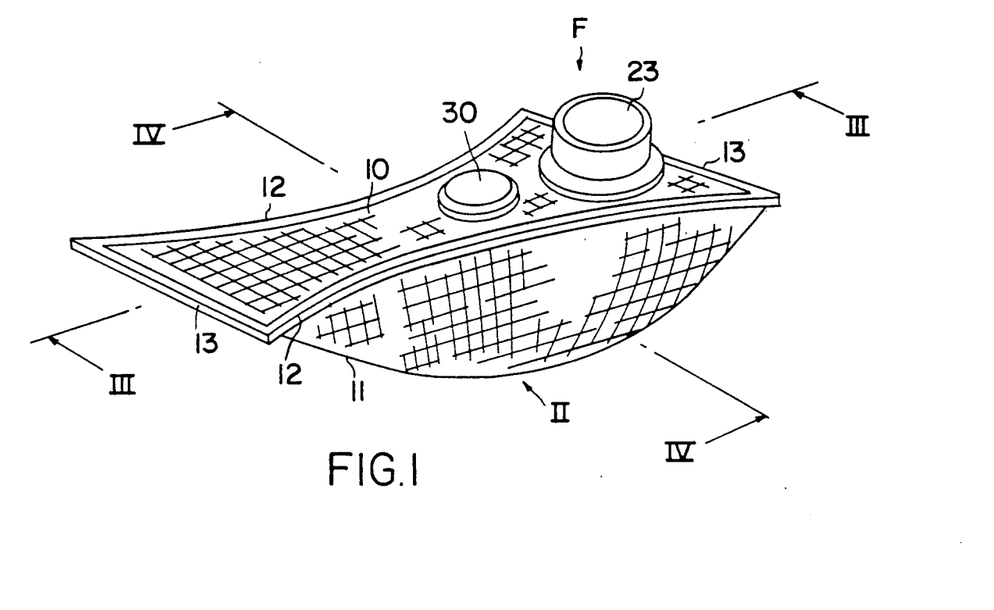
FIG. 1 is a perspective view of an embodiment of a filter arrangement in accordance with the present invention.
Figure 2:
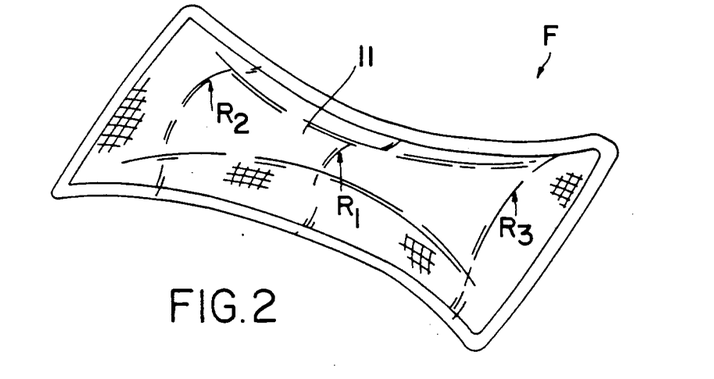
FIG. 2 is a perspective view of the filter arrangement of FIG. 1 as viewed in the direction of arrow II.
Figure 3:
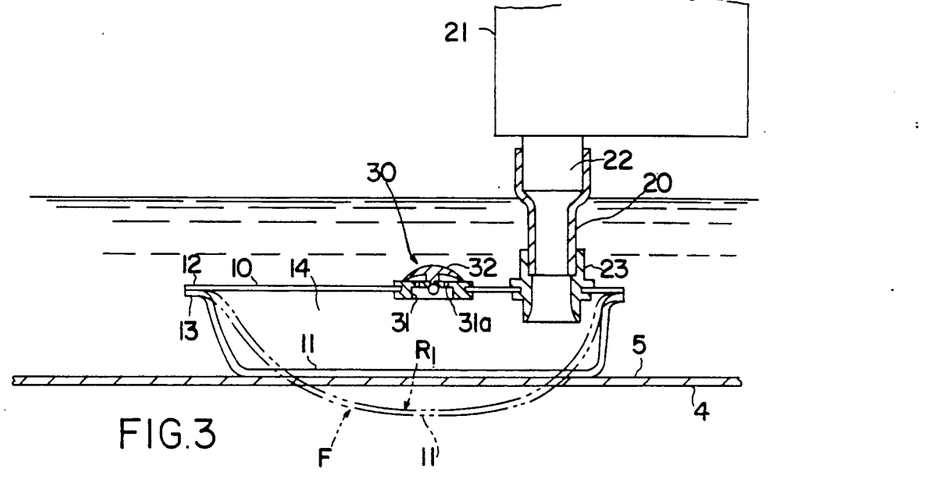
FIG. 3 is a cross-sectional view taken along Line III—III of the filter arrangement of FIG. 1 as installed in a fuel tank, showing a cross-section of the filter arrangement taken in the direction of arrows substantially along the line III—III of FIG. 1.
Figure 4:
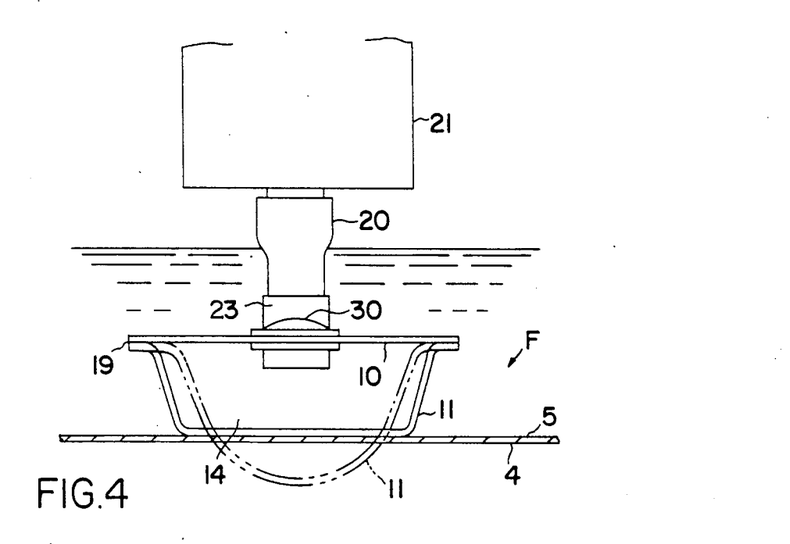
FIG. 4 is a cross-sectional view of an installation state of the filter arrangement of FIG. 1 taken along line IV—IV, showing the filter arrangement as installed in a fuel tank.

The lower section 11 has an arcuate bottom profile as shown by the phantom lines in FIGS. 3 and 4 which are vertical cross-sectional views taken along Lines III—III and IV—IV, respectively, of FIG. 1. The curvature ($1/R_1$, $1/R_2$, $1/R_3$) of the arcuate bottom profile in the vertical cross-section along Line IV—IV varies along Line III—III. In FIG. 2, $R_1$, $R_2$ and $R_3$ denote respectively the radius of curvature of the arcuate bottom profile. Thus, the curvature of the arcuate bottom profile in the vertical cross-section along Line IV—IV becomes smaller from the central portion toward the end portion of the lower section 11. The curvature ($1/R_1$) at the central portion is larger than those ($1/R_2$, $1/R_3$) at the opposite end portions as shown in FIG. 2. Thus, the joined upper and lower sections 10, 11 of the filter arrangement F define a space 14 which is supplied with fuel filtered through the mesh of the upper and lower sections 10, 11.

Figure 5:
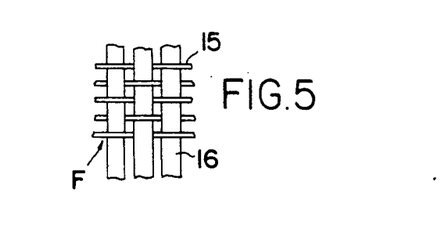
FIG. 5 is a plan view of one example of a type of mesh which can be used for the filter arrangement of FIG. 1.

The upper and lower sections can be formed of various types of mesh. Both sections need not be formed from the same type of mesh. FIG. 5 illustrates one example of a type of mesh which can be employed. This mesh is made of first linear fibers 15 and second linear fibers 16 which are woven generally perpendicular to the first linear fibers 15. The first linear fibers 15, which have a smaller diameter than the second linear fibers 16, extend in the longitudinal direction of the filter, i.e., parallel to Line III—III of FIG. 1.

Figure 8:
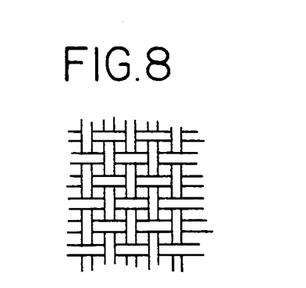
FIG. 8 is a plan view of another example of a type of mesh which can be used for the filter arrangement of FIG. 1.

FIG. 8 illustrates another example of a mesh which can be employed. This mesh has a plain weave in which all of the fibers have the same diameter.

Figure 9:
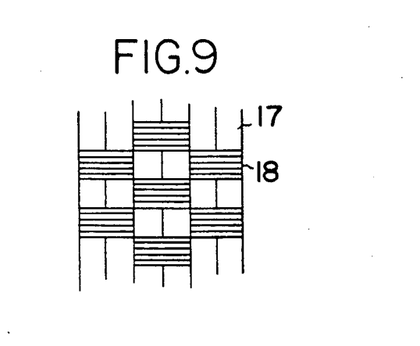
FIG. 9 is a plan view of yet another example of a type of mesh which can be used for the filter arrangement of FIG. 1.

FIG. 9 illustrates an example of another type of mesh which can be employed. This mesh has a twill weave with first linear fibers 17 and bundles of second linear fibers 18 which cross the first linear fibers 17 at right angles.

The fibers which form the mesh can be formed of various materials. Examples of suitable fibers are metal fibers made of a material such as stainless steel and plastic fibers made of a material such as nylon 6, polyvinyl dichloride, polypropylene, or polyethylene. A mesh can also be formed of a mixture of metal fibers and plastic fibers.

The diameters of the fibers can be chosen in accordance with the type of weave used to form the mesh and the desired rigidity of the mesh. An example of the mesh illustrated in FIG. 5 is one made of nylon 6 or polyvinyl dichloride with the first fibers 15 having a diameter of about 289 μm and the second fibers 16 having a diameter of about 500 μm.

An example of the mesh illustrated in FIG. 8 is one using fibers with a diameter of about 50 μm made either of stainless steel or nylon 6.

An example of the mesh illustrated in FIG. 9 is one in which the first linear fibers 17 are monofilaments of polypropylene with a diameter of about 173 μm, while the second linear fibers 18 are bundles of polyethylene fibers, each bundle having a diameter of about 165 μm. Alternatively, both the first and second fibers can be made of nylon 6.

Figure 10:
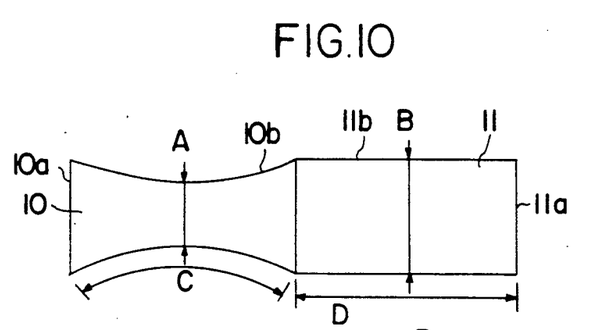
FIG. 10 is a plan view of a flat piece of mesh which can be used to form a filter arrangement according to the present invention.

FIG. 10 is a plan view of a flat piece of mesh which can be used to form a filter like the one illustrated in FIG. 1. The mesh includes a section with the shape of an hourglass which becomes the upper section 10 of the filter and a rectangular section which becomes the lower section 11 of the filter. The upper section 10 has two parallel straight sides 10a having a length B and two concave sides 10b each having a length C. The lower section 11 has two straight sides 11a with a length B and two more straight sides 11b with a length D (C=D). One of sides 11a of the lower section 11 is integral with one of the straight sides 10a of the upper section 10. The width A of the upper section 10 at approximately midway along its length is less than the width B of the lower section 11. It is possible for the upper section 10 and the lower section 11 to be formed of two separate pieces of mesh which are joined together along one side. However, for ease of manufacture, the two sections are formed from a single flat piece of mesh.

The flat piece of mesh shown in FIG. 10 is formed into a filter by bending along the common side of the two sections 10 and 11 and then joining the remaining three sides of the lower section 11 to the corresponding three sides of the upper section 10 along their entire periphery. The two sections 10 and 11 can be joined by any suitable method. For example, if the mesh is made of a plastic material, the two sections can be directly joined using a suitable adhesive or by thermal fusion of the edges of the sections. If the mesh is made of a metal such as stainless steel, the two sections can be directly joined by brazing, soldering, or welding. Alternatively, the two sections can be joined to a frame having the same contour as the upper section 10. If the mesh is formed of plastic fibers, such as polyvinyl dichloride or nylon 6, the frame can be integrally formed with the mesh fibers from the same material. For example, in FIGS. 1 and 2, the peripheral edges 12 and 13 of the upper section 10 can be enlarged during the manufacture of the mesh to form an integral frame to which the lower section is attached.

Because the lower section 11 has a larger area than the upper section 10, when it is elastically deformed from its initially flat shape to join the edges of the two sections to one another, the lower sections bends away from the upper section 10 to define a space. The elasticity of the lower section 11 prevents the lower section 11 from collapsing against the upper section 10, even when it is subjected to external pressure during the operation of a fuel filter. Accordingly, it is not necessary to provide ribs or other stiffeners to keep the two sections separated from one another, so a fuel filter according to the present invention can be easily and inexpensively manufactured.

Figure 11:
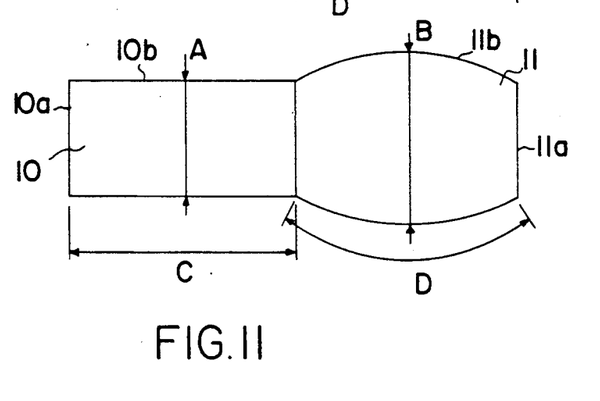
FIG. 11 is a plan view of another flat piece of mesh which can be used to form a filter arrangement according to the present invention.

FIG. 11 illustrates another example of the shape of a flat piece of mesh which can be used to form a filter according to the present invention. In this example, the upper section 10 has a rectangular shape with two parallel straight sides 10a having a length A and two more parallel straight sides 10b having a length C. The initially flat lower section 11 has two parallel straight sides 11a with a length A and two convex sides 11b which connect the straight sides 11a with one another and curve away from one another. Each of the convex sides 11b has a length D (D=C). The width B of the lower section 11 at approximately midway along its length is greater than the width A of the upper section 10. The lower section 11 is joined to the upper section 10 along its entire periphery in the same manner as described with respect to FIG. 10.

A generally cylindrical connector 23 is fixedly secured to the upper section 10 in such a manner that the axis thereof is perpendicular to the flat upper section 10. The connector 23 extends into the space 14. The connector 23 is connected by a connecting pipe 20 with a suction pipe 22 of a fuel pump 21 shown in FIG. 3. The length of the connecting pipe 20 is such that the lower side section 11 of the filter arrangement F is brought into elastic contact with the bottom inner surface 5 of the fuel tank 4 so that the bottom profile of the lower side section 11 deforms from a state indicated by the phantom lines to a state indicated by the solid lines in FIG. 3.

A valve mechanism 30 is provided in the upper section 10 to discharge fuel vapor staying at the upper part of the space 14. The valve mechanism 30 includes a umbrella-shaped elastomeric valve member 32 having a vertically-extending central rod secured to a base 31 fixedly mounted to the upper section 10. The base 31 is formed with a plurality of through-holes 31a which are closable by the peripheral or flap section of the valve member 31. The peripheral section of the valve member 31 deforms upwardly to open the through-holes 31a under the pressure of fuel vapor which is supplied from the fuel pump suction pipe 22 into the space 14, thereby releasing the fuel vapor from the space 14. This prevents vapor lock caused by sucking the fuel vapor into the fuel pump 21. When fuel is sucked by the fuel pump 21, the peripheral section of the valve member 32 is pressed against the base 31 to close the through-holes 31a. The flat upper section 10 facilitates formation of the installation sections for the connector 23 and the valve mechanism 30 thereto, and therefore facilitates the installation of these members on the upper section 10.

The manner of operation of the filter arrangement F will be discussed hereinafter.

When the fuel pump 21 is stopped, the lower section 11 of the filter arrangement F is pressed against the bottom inner surface 5 of the fuel tank 4 so and deforms as shown in FIGS. 3 and 4. Since the lower section 11 has a high rigidity and restoring force due to its arcuate bottom profile, the space 14 is maintained when the lower section 11 contacts the bottom inner surface 5 of the tank 4. Additionally, the filter arrangement F is directly in elastic contact with the bottom inner surface 5 of the fuel tank 4, and therefore vibrations and the like applied to the filter arrangement F can be effectively absorbed without necessitating any separate vibration damping member such as a coil spring.

Figure 6:
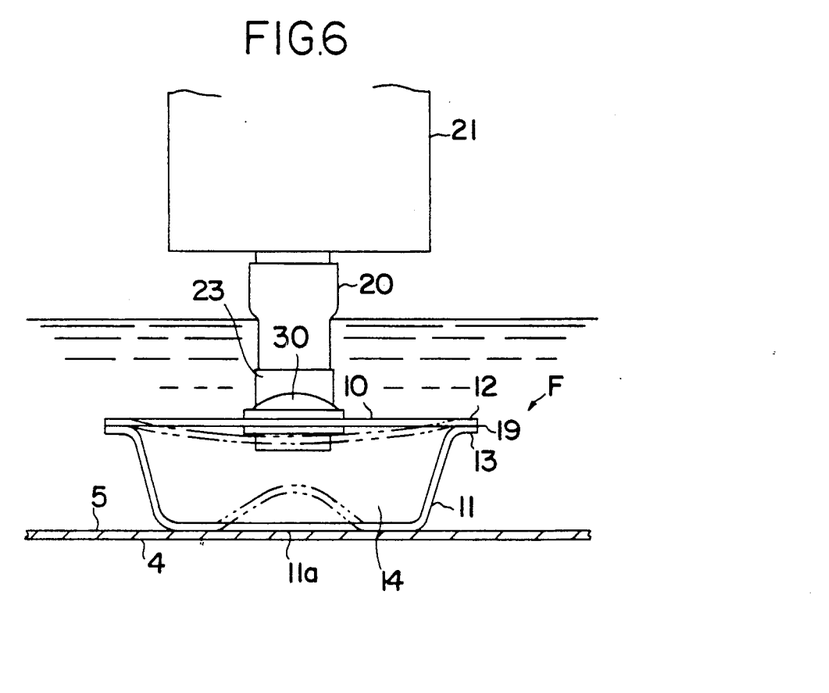
FIG. 6 is a cross-sectional view corresponding to FIG. 4 but illustrating the operation of the filter arrangement of FIG. 1.

During operation of the fuel pump 21, fuel in the fuel tank 4 is sucked through the filter arrangement F to the fuel pump 21 so a vacuum is developed within the space 14. At this time, the upper and lower sections 10, 11 of the filter arrangement F deforms toward the inside of the space 14. As shown by the phantom lines in FIG. 6, the upper section 10 is gently depressed while the lower section 11 deforms upwardly at its central section 11a while the rest of the lower section 11 is in contact with the bottom inner surface 5 of the fuel tank 4. However, the upper side section 10 only slightly deforms and is prevented from collapsing since it is flat and supported at the joint 19 between it and the lower section 11. The lower side section 11 is also prevented from collapsing or greatly deforming since its rigidity is high owing to its arcuate bottom profile in cross-section. Furthermore, the upper and lower sections 10, 11 of the filter arrangement F have a high in rigidity also owing to the fact that they are formed of the woven netting constituted of the wider linear materials 16, thereby suppressing deformation of the upper and lower sections 10, 11 of the filter arrangement F. Moreover, since the curvature of arcuate bottom profile of the lower side section 11 is not uniform throughout the length thereof and decreases from its central portion to its end portions, the state of the inward deformation at these portions is not uniform and therefore the space 14 can be reliably maintained, particularly at the portion which has a slight deformation. Thus, the upper and lower sections 10, 11 can be effectively prevented from collapsing. In addition, the difference in the manner of deforming of the upper and lower sections 10, 11 reliably prevents the upper and lower sections 10, 11 from contacting each other, thus maintaining a fuel flow passage even under suction by the fuel pump 21.

In FIG. 3, the filter is shown disposed with the lower section 11 resting on the bottom surface 5 of a fuel tank 4. However, it is also possible to mount the filter so that the lower section 11 is suspended above the bottom surface 5. In this case, when there is movement of the vehicle in which the fuel tank 4 is mounted, the filter will be subjected to vibrations. Because of the elasticity of the lower section 11, it will expand and contract with the vibrations, and this movement of the lower section 11 will dislodge dirt and the like adhering to the mesh. The dislodged dirt will then settle to the bottom of the fuel tank 4. As a result, the surface of the filter is automatically cleaned and can be prevented from becoming clogged with dirt.

Normally, it is desirable that the inlet to the connecting pipe 20 be near to the bottom of the fuel tank 4 to suck fuel even when the fuel tank 4 is nearly empty. For this reason, a fuel filter according to the present invention is constructed so that it can be installed on the bottom surface of a fuel tank 4. Since the lower section 11 of the filter is elastic, it can expand or contract to compensate for variations in the length of the connecting pipe 20 or for thermal expansion of the connecting pipe 20 during operation. Therefore, it is not necessary to install a sliding joint or an expansion joint between the connecting pipe 20 and the filter or the fuel pump 21, the length of the connecting pipe 20 does not need to be precise, the connecting pipe 20 can be easily connected between the filter and the fuel pump 22, and thermal stresses are not generated due to expansion of parts.

In conventional filter arrangements employing ribs or rigid separating members to prevent the filter sections from coming into contact with one another when subjected to pressure, considerable noise may be generated due to contact of these members with the bottom surface of a fuel tank. A filter arrangement according to the present invention does not require ribs or other support members, so it does not produce noise when the vehicle is cruising.

What is claimed is:

1. A filter arrangement constructed and arranged for installation in a fuel tank comprising:
    a first section made of a generally flat mesh; and
    a second section made of a generally flat mesh and connected to said first section to define a pocket between said first and second sections, said second section having a different shape from said first section and a larger total surface area than said first section, wherein the first and second sections are sufficiently differently shaped and are arranged such that the pocket does not collapse when subjected to a differential pressure within the fuel tank.

2. A filter arrangement as claimed in claim 1 wherein said second section has an upper peripheral portion connected to a peripheral portion of said first section, and a bottom portion having a cross-sectional profile with a non-uniform curvature which varies in accordance with direction.

3. A filter arrangement as claimed in claim 1 wherein said second section contacts a bottom wall of a fuel tank and is deformed inwards from an initial shape towards said first netting section by the bottom wall.

4. A filter arrangement as claimed in claim 1 further comprising a valve mechanism connected to said first section for releasing fuel vapor staying in said space under pressure of the fuel vapor.

5. A filter arrangement as claimed in claim 1 further comprising a connecting pipe mounted on said first section for connecting said pocket with a fuel pump, said connecting pipe being separated from said second section.

6. A filter arrangement as claimed in claim 5 wherein said connecting pipe extends vertically relative to a bottom wall of the fuel tank and said second section contacts the fuel tank bottom wall.

7. A filter arrangement as claimed in claim 1 wherein said first and second sections have sufficient rigidity to prevent their deforming inwards against one another in the absence of an external restraint when the pocket is subjected to suction from a fuel pump.

8. A filter arrangement as claimed in claim 1 wherein said second section has a bottom which is initially curved and which is deformed inwards toward the first section to conform to a bottom surface of the fuel tank when the second section is disposed on the bottom surface of the fuel tank.

9. A filter arrangement as claimed in claim 1 wherein said first section has a lengthwise center and a variable width which decreases towards the lengthwise center.

10. A filter arrangement as claimed in claim 9, wherein said first section has first and second sides and third and fourth sides which connect the first and second sides and curve towards one another.

11. A filter arrangement as claimed in claim 1 wherein said second section has a lengthwise center and a variable width which increases towards the lengthwise center as measured along a surface of said second section.

12. A fuel system comprising:
a fuel tank having a bottom wall;
a fuel pump; and
a filter disposed inside said fuel tank and comprising:
a first section made of a generally flat mesh and spaced from the bottom wall of said fuel tank; and
a second section made of a generally flat mesh and connected to said first section to define a pocket between said first and second sections, said pocket communicating with said fuel pump, said second section having a different shape from said first section and a larger total surface area than said first section, said second section contacting the bottom wall of said fuel tank, wherein the first and second sections are sufficiently differently shaped and are arranged such that the pocket does not collapse when subjected to a differential pressure within the fuel tank.

13. A filter arrangement constructed and arranged for installation in fuel tank comprising:
a first section disposed in the fuel tank and made of a generally flat mesh; and
a second section disposed inside the fuel tank and made of a generally flat mesh and connected to said first section to define a pocket between it and said first section, said pocket communicating with a fuel pump, said second section having a different shape from said first section and a larger total surface area than said first section, the first and second sections being sufficiently differently shaped and arranged such that the pocket does not collapse when subjected to a differential pressure within the fuel tank, both of said meshes being made of first fibers and second fibers which are woven transversely with respect to the first fibers and which have a greater diameter than the first fibers.

14. A filter arrangement constructed and arranged for installation in a fuel tank comprising:
a first piece of mesh which is initially flat and which has a periphery; and
a second piece of mesh having a larger surface area than the first piece of mesh and having a periphery and being elastically deformed from an initially flat shape to bring the entire periphery of the second piece of mesh into contact with the periphery of the first piece to define a space between the first and second pieces of mesh, the first and second pieces of mesh being connected to one another along their peripheries, wherein the first and second sections are sufficiently differently shaped and are arranged such that the space does not collapse when subjected to a differential pressure within the tank.

15. A filter arrangement as claimed in claim 14 wherein the first piece of mesh is rectangular and the second piece of mesh has opposing curved sides which curve away from one another.

16. A filter arrangement as claimed in claim 14 wherein the first piece of mesh has two parallel straight sides and two curved sides which curve towards each other, and the second piece of mesh is initially rectangular.

17. A filter arrangement as claimed in claim 16 wherein the first piece of mesh has a minimum width as measured between the curved sides which is less than a width of the second piece of mesh.

18. A filter arrangement as claimed in claim 14 wherein the first and second pieces of mesh are formed from a single flat piece of mesh and are integral with one another along a common side.

19. A filter arrangement as claimed in claim 14 wherein:
each piece of mesh has a longitudinal dimension and a transverse dimension that is shorter than the longitudinal dimension;
each piece of mesh is woven from longitudinally extending first fibers and transversely extending second fibers, the second fibers having a greater diameter than the first fibers.

20. A filter arrangement constructed and arranged for installation in a fuel tank comprising:
a first piece of mesh which is initially flat and has a periphery and first and second parallel sides and third and fourth curved sides which connect the first and second sides;
a generally rectangular second piece of mesh having a periphery and first and second parallel sides and third and fourth parallel sides and a different surface area from the first piece of mesh, each side of the second piece of mesh having the same length as a corresponding side of the first piece of mesh, the second piece of mesh being elastically bent from an initially flat shape to bring each side of the second piece of mesh into contact with the corresponding side of the first pieces of mesh and to define a space between the first and second pieces of mesh, the first and second pieces of mesh being sufficiently rigid and sufficiently different in shape to prevent the space from collasping when subjected to suction from a fuel pump; and means for connecting the first and second pieces of mesh along their entire peripheries.

21. A filter arrangement as claimed in claim 20 wherein a minimum width of the first piece of mesh as measured between the third and fourth sides thereof is less than a width of the second piece of mesh as measured between the third and fourth sides thereof.

22. A filter arrangement as claimed in claim 20 wherein the third and fourth sides of the first piece of mesh curve towards each other.

23. A filter arrangement as claimed in claim 20 wherein the third and fourth sides of the first piece of mesh curve away from each other.

24. A filter arrangement constructed and arranged for installation in a fuel tank comprising:

a generally flat first section made of mesh and having a periphery;

a second section made of mesh and having a periphery and a larger total surface area than the first section;

connecting means for securely connecting the periphery of the first section and the periphery of the second section and deforming the second section so that at least a central part of the second section is separated from the first section to define a space between the first and second sections, wherein the first and second sections are sufficiently differently shaped and are arranged such that the space does not collapse when subjected to a differential pressure within the fuel tank.

25. A filter arrangement constructed and arranged for installation in a fuel tank comprising:

a generally flat first section made of mesh and having a periphery;

a second section having a periphery and a larger total surface area than the first section and made of a mesh woven from filaments selected from the group consisting of plastic and metal; and connecting means for securely connecting the periphery of the first section and the periphery of the second section and deforming the second section so that at least a central part of the second section is separated from the first section to define a space between the first and second sections, wherein the first and second sections are sufficiently differently shaped and are arranged such that the space does not collapse when subjected to a differential pressure within the fuel tank.

26. A filter arrangement constructed and arranged for installation in a fuel tank comprising:

a generally flat first section made of mesh, the first section being generally rectangular and having first and second sides which are opposite each other, and third and fourth sides which are opposite each other;

a second section having a larger total surface area than the first section and made of a woven mesh formed of filaments selected from the group consisting of plastic and metal, the second section being generally rectangular and having first and second sides which are opposite each other, and third and fourth sides which are opposite each other;

connecting means for securely connecting the first, second, third, and fourth sides of the second section with the first, second, third, and fourth sides of the first section, respectively, and bending the second section so that at least a central portion of the second section is separated from the first section to define a space between the first and second sections, wherein the first and second sections are sufficiently differently shaped and are arranged such that the space does not collapse when subjected to a differential pressure within the fuel tank.

27. A filter arrangement as claimed in claim 26 wherein the first and second sides of the first section have first and second side edges, respectively, and the first and second sides of the second section have first and second side edges, respectively, and a width of the first section as measured between the first and second side edges at a central portion of the first section is smaller than a width of the second section as measured between the first and second side edges at the central portion of the second section.

28. A fuel supply system for an automotive vehicle comprising:

a fuel tank having a bottom inner surface;

a fuel pump; and a filter disposed inside the fuel tank and communicating with the fuel pump, the filter including:

a generally flat first section made of mesh and having a periphery;

a second section having a periphery and a larger total surface area than the first section and made of mesh woven from filaments selected from the group consisting of plastic and metal; and connecting means for securely connecting the periphery of the first section and the periphery of the second section and deforming the second section into generally the shape of a vessel so that at least a central part of the second section is separated from the first section to define a space between the first and second sections, the space communicating with the fuel pump, the first and second sections being sufficiently differently shaped and arranged such that the space does not collapse when subjected to a differential pressure within the fuel tank; and means for positioning the filter so that the second section is in contact with the bottom inner surface of the fuel tank.

29. A fuel supply system as claimed in claim 28 wherein the fuel pump is disposed inside the fuel tank.

30. A fuel supply system as claimed in claim 29 wherein the filter includes a pipe-shaped connector secured to the first section and fluidly communicating with the space.

31. A fuel supply system as claimed in claim 30 comprising a connector pipe for securely connecting the connector of the filter with the fuel pump, the connector pipe and the connector being spaced from the second section.

* * * * *

UNITED STATES PATENT AND TRADEMARK OFFICE
CERTIFICATE OF CORRECTION

PATENT NO. : 5,049,267

DATED : September 17, 1991

INVENTOR(S) : Sasaki et al

It is certified that error appears in the above-identified patent and that said Letters Patent is hereby corrected as shown below:

Column 7, line 9, change "space" to --pocket--;
 line 62, after "in" insert --a--.

Column 9, line 1, change "pieces" to --piece--.

Signed and Sealed this

Ninth Day of March, 1993

Attest:

STEPHEN G. KUNIN

*Attesting Officer*    *Acting Commissioner of Patents and Trademarks*